(12) United States Patent
Allen (10) Patent No.: US 11,396,935 B2
(45) Date of Patent: Jul. 26, 2022

(54) DIFFERENTIAL HAVING ARMATURE POSITION DETECTION

(71) Applicant: Eaton Intellient Power Limited, Dublin (IE)

(72) Inventor: Jordan Robert Allen, Galesburg, MI (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 17/120,745

(22) Filed: Dec. 14, 2020

(65) Prior Publication Data

US 2021/0131542 A1    May 6, 2021

Related U.S. Application Data (63) Continuation-in-part of application No. PCT/EP2019/025182, filed on Jun. 14, 2019.

(60) Provisional application No. 62/684,836, filed on Jun. 14, 2018.

(51) Int. Cl.
| | |
|---|---|
| F16H 48/34 | (2012.01) |
| F16H 48/24 | (2006.01) |
| F16D 27/00 | (2006.01) |
| F16D 27/09 | (2006.01) |

(52) U.S. Cl.
CPC ............ *F16H 48/34* (2013.01); *F16H 48/24* (2013.01); *F16D 27/09* (2013.01); *F16D 2027/005* (2013.01); *F16H 2048/346* (2013.01)

(58) Field of Classification Search
CPC .................. F16D 27/10–118; F16D 2027/005
See application file for complete search history.

(56) References Cited

U.S. PATENT DOCUMENTS

| | | | | |
|---|---|---|---|---|
| 5,361,917 A | * | 11/1994 | Mautino ................... | B61G 9/24 213/50 |
| 6,041,904 A | * | 3/2000 | Kuroda .............. | B60K 23/0808 192/113.34 |
| 6,668,996 B2 | * | 12/2003 | Nekado ................. | F16D 27/115 192/30 W |

(Continued)

FOREIGN PATENT DOCUMENTS

| | | |
|---|---|---|
| GB | 2367623 A | 4/2002 |
| GB | 2382227 A | 5/2003 |
| JP | 2004208460 A | 7/2004 |

OTHER PUBLICATIONS

International Search Report and Written Opinion for International Application No. PCT/EP2019/025182 dated Oct. 4, 2019.

*Primary Examiner* — Ernesto A Suarez
*Assistant Examiner* — James J Taylor, II
(74) *Attorney, Agent, or Firm* — RMCK Law Group PLC (57) ABSTRACT

A position detection device configured for use with a locking differential is configured to determine a position of an armature in relation to a stator. The stator has a primary coil. The armature moves relative to the stator between engaged and disengaged positions corresponding to the locking differential being in a locked and unlocked state. The position detection device includes a secondary coil disposed proximate to the primary coil. The secondary coil is configured to determine a change in inductance based on movement of the armature. The change in inductance is indicative of a change in position of the armature relative to the stator.

12 Claims, 10 Drawing Sheets

(56) References Cited

U.S. PATENT DOCUMENTS

| | | | |
|---|---|---|---|
| 6,902,506 B2 * | 6/2005 | Schrand | F16H 48/08 137/540 |
| 7,002,444 B2 * | 2/2006 | Iwazaki | F16D 27/14 335/251 |
| 7,059,453 B2 * | 6/2006 | Yamamoto | B60T 13/748 188/161 |
| 7,357,749 B2 * | 4/2008 | Nofzinger | F16H 48/16 475/231 |
| 11,118,665 B2 * | 9/2021 | Creech | F16H 48/24 |
| 2015/0133254 A1 * | 5/2015 | Fox | F16H 48/08 475/150 |
| 2015/0136559 A1 * | 5/2015 | Brumberger | F16D 27/115 192/84.9 |
| 2017/0191556 A1 | 7/2017 | Cochren et al. | |

* cited by examiner

DIFFERENTIAL HAVING ARMATURE POSITION DETECTION

CROSS-REFERENCE TO RELATED APPLICATION(S)

This application is a bypass continuation of International Patent Application No. PCT/EP2019/025182, filed Jun. 14, 2019, which claims the benefit of U.S. Provisional Patent Application Ser. No. 62/748,333, filed Oct. 19, 2018 and U.S. Provisional Patent Application Ser. No. 62/684,886, filed Jun. 14, 2018. Each of the above-identified applications is hereby incorporated by reference in its entirety.

FIELD

The present teachings relate, in general, to electronically actuated locking differentials and, in particular to an electronically actuated locking differential having a secondary coil that measures a change in inductance to determine the position of an armature in relation to a stator in the locking differential.

BACKGROUND

In automotive applications, an electronically actuated locking differential of the related art may be actuated electronically and is designed for forward-wheel-drive (FWD), rear-wheel-drive (RWD), all-wheel-drive (AWD), and four-wheel-drive (4WD) vehicles to allow the differential to be locked or unlocked when it is so desired. The driver can lock the front and/or rear wheels by manually activating a switch or button mounted to a dash or console of the vehicle. In this type of torque-controlling device, the armature is allowed to spin or rotate with the differential and the armature is not mechanically attached to a lock plate within the differential.

While locking differentials of this type have generally worked for their intended purposes, certain disadvantages remain. More specifically, these arrangements limit the ability to electronically sense the locked state of the differential. Further, adding a sensor to a rotating armature might be a cause for increased costs because the sensor is non-contacting. Also, wear and durability become a concern with any sensor being attached to a rotating armature.

SUMMARY

A position detection device configured for use with a locking differential is configured to determine a position of an armature in relation to a stator. The stator has a primary coil that defines a primary coil axis. The armature moves relative to the stator between engaged and disengaged positions corresponding to the locking differential being in a locked and unlocked state. The position detection device includes a secondary coil disposed proximate to the primary coil. The secondary coil defines a secondary coil axis. The secondary coil is positioned such that the primary and secondary coil axes are offset and parallel. The secondary coil is configured to determine a change in inductance based on movement of the armature. The change in inductance is indicative of a change in position of the armature relative to the stator.

According to additional features, the primary coil is disposed within a boundary of the stator. The stator can define a housing. The primary and secondary coils are disposed within the housing. The secondary coil can determine (i) when the primary coil is on and (ii) when the primary coil is off. A primary coil status indicator can indicate an energized state of the primary coil. The secondary coil can determine (iii) when the armature is in the disengaged positon and (iv) when the armature is in the engaged position. A locked status indicator can indicate whether the armature is locked or unlocked. The armature is mechanically coupled to a housing of the locking differential with a retaining clip. The retaining clip can be formed of low magnetic permeable material. The high permeable material can comprise 302 stainless steel.

According to additional features, the primary coil defines a primary coil outer diameter. The secondary coil defines a secondary coil outer diameter. The secondary coil outer diameter is at least less than half of the primary coil outer diameter. In other arrangements, the secondary coil outer diameter is less than one-third of the primary coil outer diameter. In other arrangements, the secondary coil outer diameter is less than one-fifth of the primary coil outer diameter.

A position detection device configured for use with a locking differential according to additional features of the instant application is configured to determine a position of an armature in relation to a stator. The stator has a primary coil. The armature moves relative to the stator between engaged and disengaged positions corresponding to the locking differential being in a locked and unlocked state. A sensor is disposed proximate to the primary coil and within a boundary of the stator. The sensor is configured to determine a change in inductance based on movement of the armature. The change of inductance is indicative of a change in position of the armature relative to the stator.

According to additional features, the primary coil is disposed within a boundary of the stator. The sensor can determine (i) when the primary coil is on and (ii) when the primary coil is off. A primary coil status indicator can indicate an energized state of the primary coil. The sensor can determine (iii) when the armature is in the disengaged position and (iv) when the armature is in the engaged position. A locked status indicator can indicate whether the armature is locked or unlocked.

DRAWINGS

Other aspects of the present teachings will be readily appreciated as the same becomes better understood after reading the subsequent description taken in connection with the accompanying drawings wherein.

DETAILED DESCRIPTION

Figure 1:
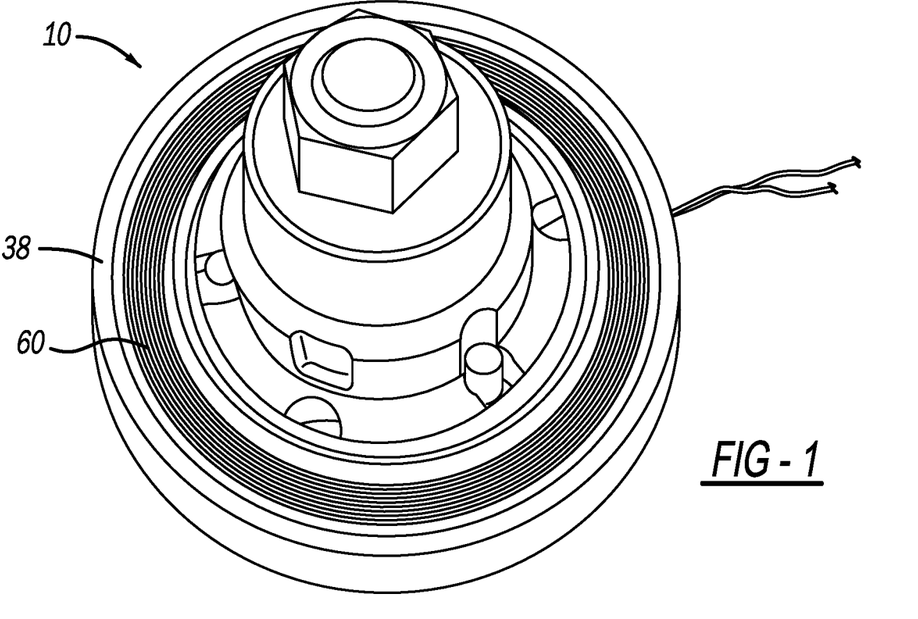
FIG. 1 is a partial perspective view of an electronically actuated locking differential incorporating a secondary coil according to one example of the present teachings.
Figure 2:
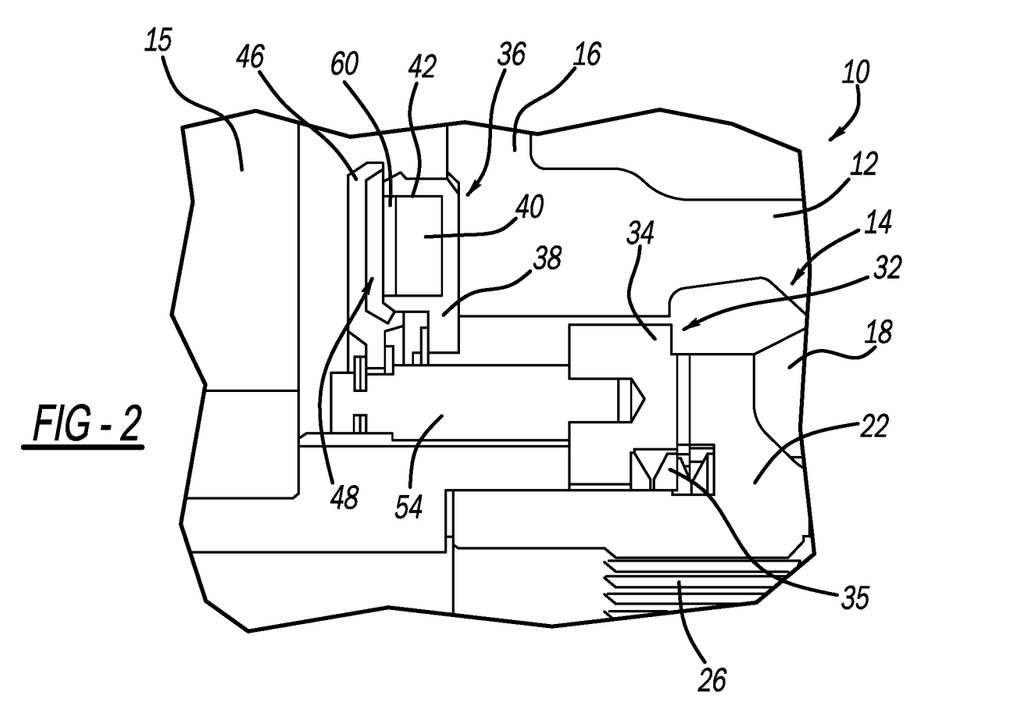
FIG. 2 is a partial sectional view of the electronically actuated locking differential of FIG. 1.
Figure 3:
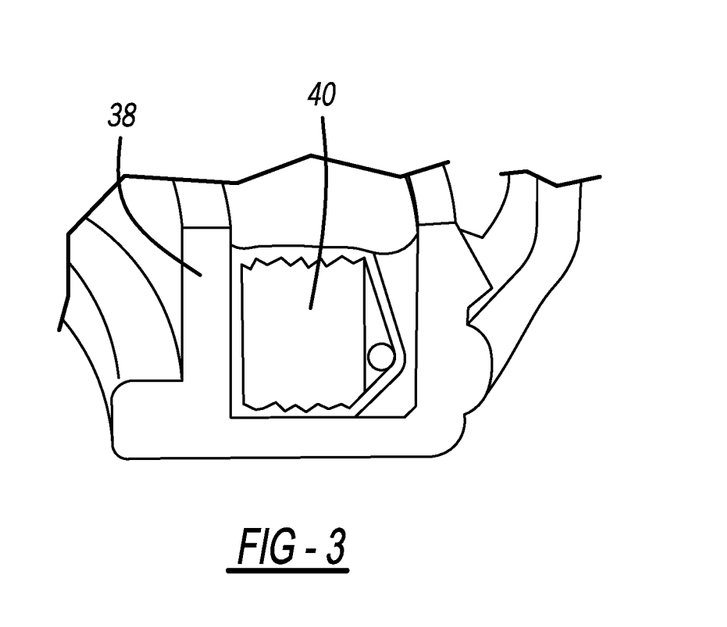
FIG. 3 is a cross sectional view of a stator constructed in accordance to prior art.

One representative example of an electronically actuated locking differential of the type contemplated by the present teachings is generally indicated at 10 in FIGS. 1 and 2. As shown in FIG. 2, the differential 10 includes a gear case, generally indicated at 12, and an end cap (not shown), which may be fastened to the gear case 12 by any suitable fastener, such as by a plurality of bolts (not shown). The gear case 12 and end cap cooperate with each other to define a gear chamber, generally indicated at 14. The differential 10 can be housed within a differential case 15. Torque input to the differential 10 is typically by an input ring gear (not shown), which may be attached to a flange 16. A gear set is supported within the gear chamber 14 and has at least a pair of input pinion gears 18. The pinion gears 18 are mounted rotatably about a pinion shaft (not shown), which is secured relative to the gear case 12 by any suitable mechanism. The pinion gears 18 are input gears of the gear set and in meshing engagement with a respective pair of left and right side gears, 22 (one side gear shown in the FIGS.). The side gears 22 define respective sets of internal, straight splines 26 (only one shown for gear 22) that are adapted to be in splined engagement with mating external splines on a respective pair of left and right axle shafts (not shown).

With general reference now to FIGS. 1-7, features of the instant application will now be described. A rotation-prevention mechanism, generally indicated at 32, has a generally annular collar member or lock plate 34 and is disposed entirely within the gear case 12 and operably associated with side gear 22 (the first output gear). The lock plate 34 is spaced from the side gear 22 and is slideable along the outer surface of the side gear 22. The lock plate 34 is biased toward the non-actuated, "unlocked" mode by a return spring 35 such as a wave spring. An electronic actuator, generally indicated at 36, is disposed primarily external to the gear case 12. More specifically, the electronic actuator 36 is disposed at the end of and about the gear case 12 adjacent side gear 22 (the first output gear). The electronic actuator 36 has a stator 38 primarily external to the gear case 12. More specifically, the stator 38 is disposed at the end of and about the gear case 12 adjacent to the flange 16. The stator 38 is stationary and non-rotating relative to the gear case 12.

The electronic actuator 36 also has an electromagnetic (primary) coil, generally indicated at 40, that is disposed in a cavity 42 of the stator 38. The electromagnetic coil 40 is energized by a pair of electrical leads 44 (FIG. 5) and receives direct current (DC) from a source (not shown). The electronic actuator 36 also has an armature, generally indicated at 46, spaced from the electromagnetic coil 40 to form a gap 48 therebetween. The armature 46 is mechanically coupled to the lock plate 34 by an annular slip ring 54.

Figure 4:
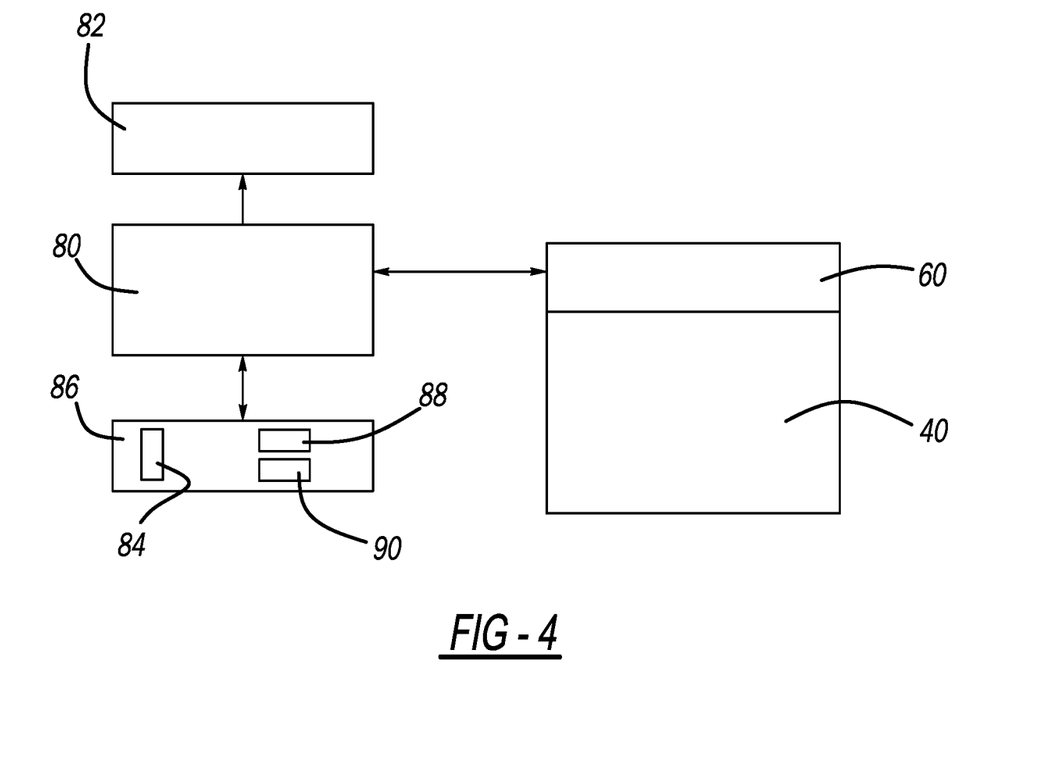
FIG. 4 is a schematic illustration of a primary coil and secondary coil arrangement of a locking differential of the present disclosure.
Figure 5:
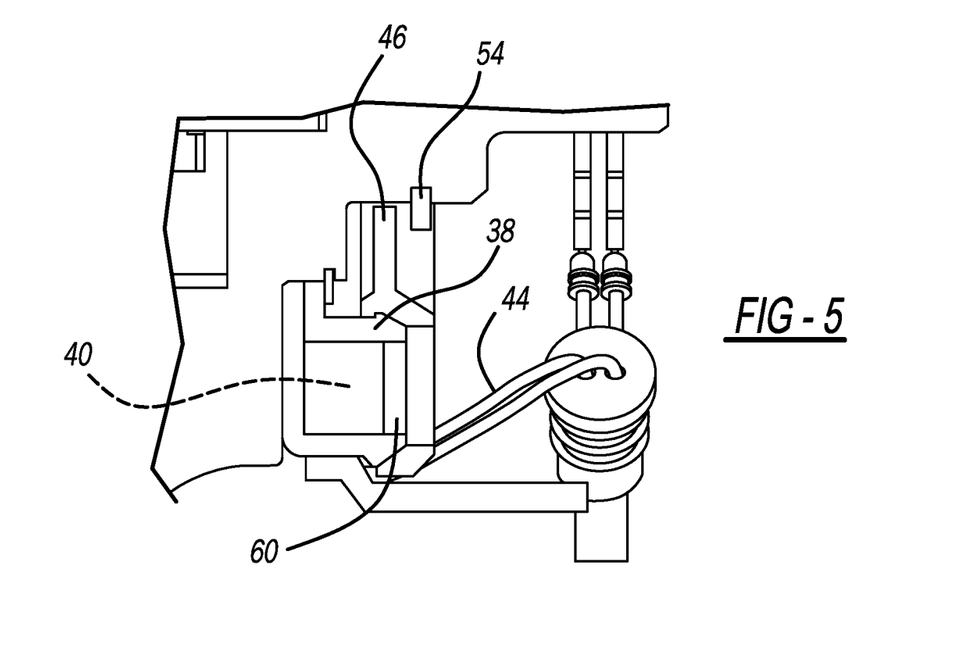
FIG. 5 is another cross-sectional view of the locking differential of FIG. 2.
Figure 6:
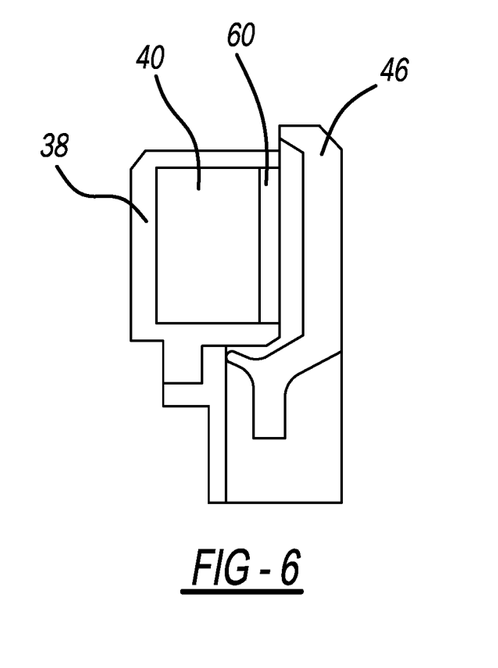
FIG. 6 is a side view of the armature, stator and secondary coil and shown with the armature disengaged.

The actuator 36 includes a position detection device or secondary coil 60 disposed in the stator 38 as will be described herein. The secondary coil 60 can be placed on or near the primary coil 40 within the boundary of the housing of the stator 38. The secondary coil 60 is used to determine the position of the armature 46 relative to the stator 38 to interpret the state of the differential 10 in the locked, semi-engaged or unlocked condition. As shown in FIG. 4, a signal can be sent from the secondary coil 60 indicative of a change in inductance to a controller 80 that sends a signal to a display, cluster or other vehicle instrumentation 82 to convey the locking state of the differential 10 to the driver.

During normal, straight-ahead operation of a vehicle within which the differential 10 is employed, no differentiation occurs between the left and right axle shafts or side gears (side gear 22 shown). Therefore, the pinion gears 18 do not rotate relative to the pinion shaft 20. As a result, the gear case 12, pinion gears 18, and side gears all rotate about an axis of rotation as if the gear case 12, pinion gears 18, and side gears are a solid unit.

When direct current (DC) power is supplied to the electromagnetic coil 40, magnetic energy is generated within the stator 38 which creates an attractive force between the armature 46 and stator 38 starting at around 40 lbf and ending at around 250 lbf and causing the armature 46 to move toward the stator 38. This force is transferred through the slip ring 54 and to the lock plate 34 compressing the return spring 62 until the lock plate 34 exerts a required retarding torque on the side gear 22, locking it to the differential case 12 and thus locking the LH and RH axle shafts independent of driveline rotation. It should be appreciated in light of the disclosure that the differential 10 allows the LH and RH axle shafts to remain locked independent of vehicle direction. It should also be appreciated in light of the disclosure that the differential 10 is preferred for applications where frequent rock cycles or direction reversals are common such as during snow plowing. It should further be appreciated in light of the disclosure that the differential 10 also enables ease of lock detection by repositioning the slip ring 54 away from the electromagnetic coil 40, allowing both the stator 38 and the armature 46 to remain stationary relative to the rotation of the differential 10.

The differential 10 may be controlled manually, wherein a driver of the vehicle manually selects "locked" mode (rather than "unlocked" mode) to operate the differential 10. For example, when, say the vehicle is at rest, the driver simply manually activates a switch or button 84, such as a simple momentary-type "on/off" toggle or rocker switch or push button, mounted to a dash or console 86 of the vehicle. The console 86 can be integrated into the vehicle instrumentation 82. In this way, an electric circuit (not shown) is closed, thereby turning on current in the circuit and a lamp (not shown) located in or near the toggle switch or push button 84 to indicate to the driver that the differential is actuated. Current flows in the circuit and ultimately to the electromagnetic coil 40 of the differential 10. The differential 10 then operates in the "locked" mode (i.e., when the vehicle is in first gear or reverse). In this way, the first output gear 22 is locked relative to the gear case 12, preventing any further differentiation between the first output gear 22 and gear case 12.

By not allowing the armature 46 to rotate, parasitic losses can be eliminated when the differential 10 is locked because any frictional drag between the armature 46 and the stator 38 is eliminated. The electronic actuator 36 of the present teachings creates less heat within the differential 10 due to less friction. Since the armature 46 is mechanically coupled to the lock plate 34, locking and unlocking of the differential 10 can be detected or sensed based on the axial position of the armature 46.

Figure 7:
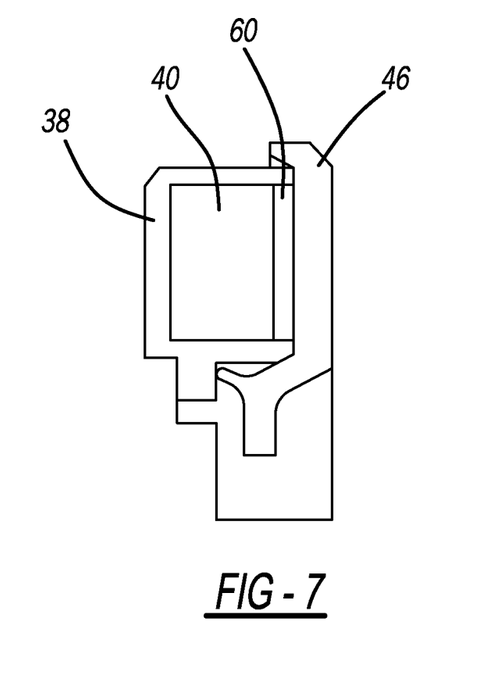
FIG. 7 is a side view of the armature, stator and secondary coil and shown with the armature disengaged.

With general reference to FIGS. 2-7, the secondary coil 60 will be further described. During operation, the secondary coil 60 can detect a position of the armature 46 by using the change in inductance of the secondary coil 60. In this regard, as the armature 46 moves left and right and viewed in FIG. 2, the inductance of the secondary coil 60 changes and the position of the armature 46 can be determined. It will be appreciated that the secondary coil 60 can send a signal to the controller 80 that sends a signal to a display, cluster or other vehicle instrumentation 82 to convey the locking state of the differential 10 to the driver. By knowing the position of the armature 46, the state (fully locked, fully unlocked, positions intermediate of locked and unlocked) of the locking differential 10 can be determined. Explained further, the configuration of the present disclosure can determine four states, namely (i) when the primary coil 40 is on (energized), (ii) when the primary coil 40 is off (de-energized), (iii) when the armature 46 is in the disengaged (unlocked) position (FIG. 6), and (iv) when the armature 46 is in the engaged (locked) position (FIG. 7). In some examples, the console 86 can further include a primary coil status indicator 88 that indicates an energized state of the primary coil 40 and a locked status indicator 90 that indicates whether the armature 46 (or more generally the differential 10) is locked or unlocked.

The configuration of the secondary coil 60 allows the assembly to act in a linear manner whereby it can be determined, even if the primary coil 40 is on (energized), whether the armature 46 is all the way into the locked position (FIG. 7). In other words, just because the primary coil 40 is energized, does not guarantee that the armature 46 has moved in to the locked position. There may be a point where the differential assembly 10 may not completely attain a locked position due to gear teeth interaction (such as being bound up).

Figure 8:
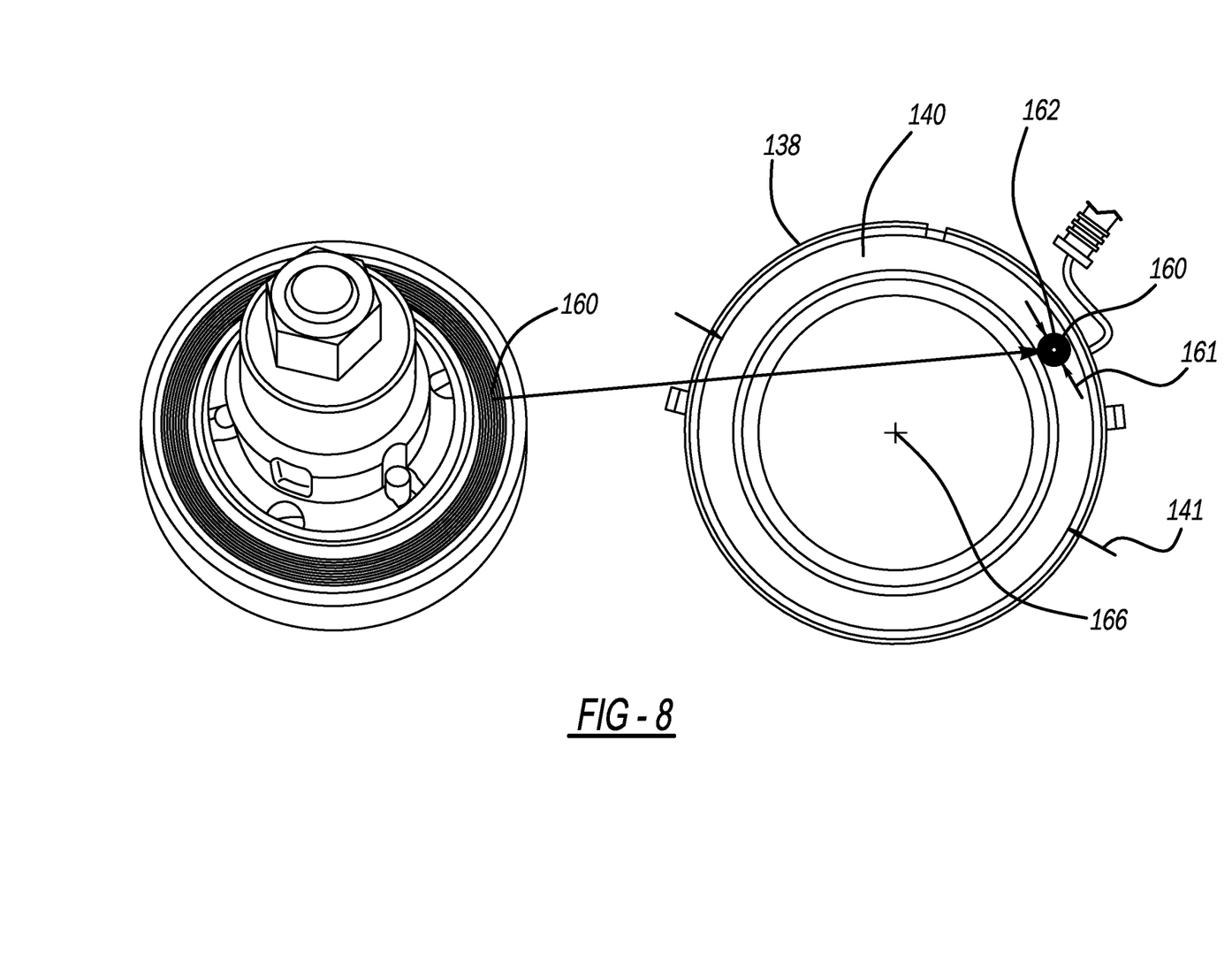
FIG. 8 is a plan view of a secondary winding constructed in accordance to another example of the present disclosure.

Turning now to FIG. 8, a secondary winding constructed in accordance to another example of the present disclosure is shown and generally identified at reference 160. The secondary winding 160 is shown relative to a primary coil 140 on a stator 138. The primary coil 140 defines a primary coil central axis 166. The secondary winding 160 defines a secondary coil central axis 162 that is parallel to the primary coil central axis 166. In the example shown, the secondary coil central axis 162 is generally parallel and offset relative to the primary coil central axis 166 defined by the primary coil 140. Electromagnetic interference (EMI) is greatly reduced as a result of the orientation of the secondary winding 160 relative to the primary coil 140. Armature position detection is possible even when the primary coil 140 is receiving DC current. The configuration of the primary and secondary coils 140, 160 being parallel and offset provides performance advantages over prior art configurations that may have the primary and secondary coils arranged on common axes. In prior art examples that may have primary and secondary coils of similar size diameter, when the primary coil is energized, a forced inductance may occur with the secondary coil. In this regard, such prior art arrangements can cause interference. The instant configuration has a secondary coil 160 with a greatly reduced outer diameter 161 compared to the outer diameter 141 of the primary coil 140. This relationship as well as an offset and parallel axes 162, 166, causes interference to be mitigated.

In some examples, the secondary coil outer diameter 161 can be less than half of the primary coil outer diameter 141. In other examples, the secondary coil outer diameter 161 can be even less, such as, but not limited to one-third, one-fifth, one-tenth or less than the primary coil outer diameter 141.

Figure 9:
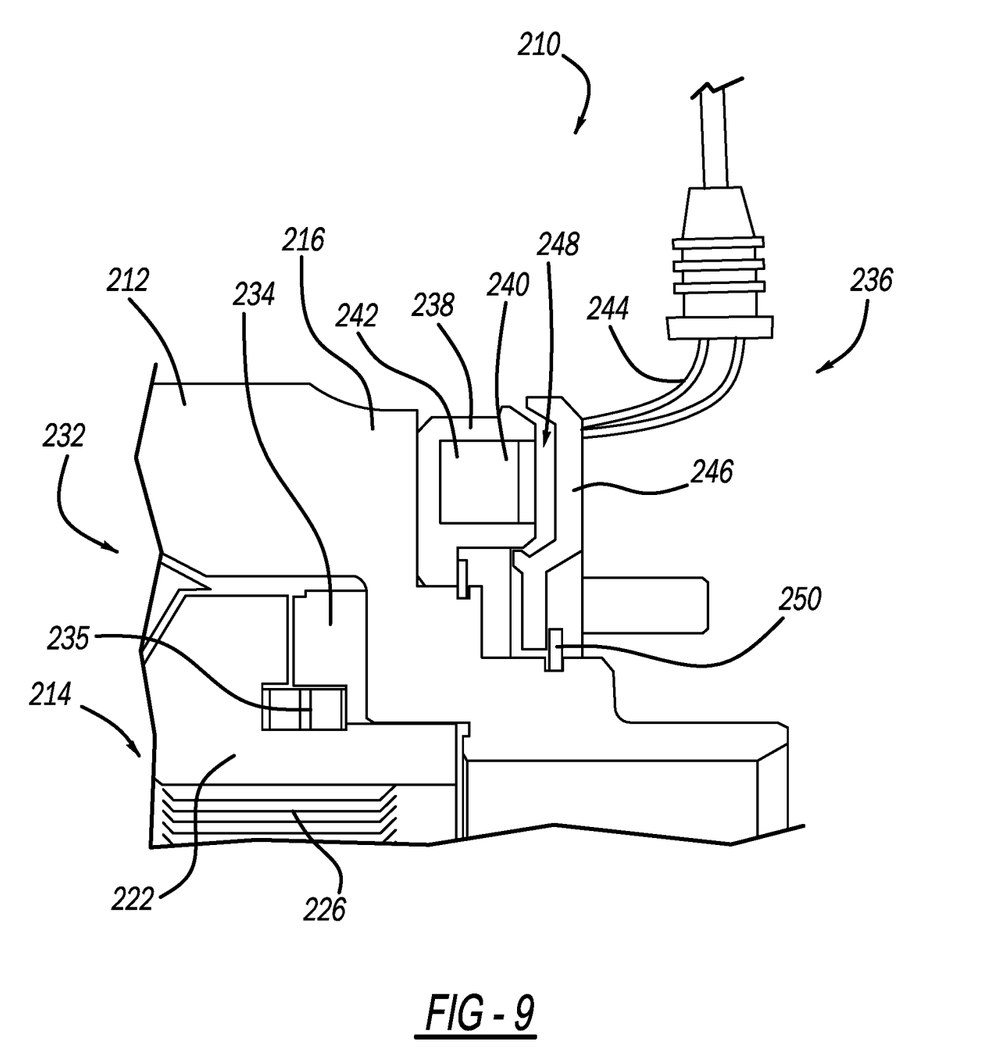
FIG. 9 is a partial sectional view of an electrically actuating locking differential that incorporates a retaining clip formed of a low permeable material according to another example of the present disclosure.

With reference now to FIG. 9, an electronically actuated locking differential constructed in accordance to additional features of the present disclosure is shown and generally identified at reference 210. The differential 210 generally includes a differential housing or gear case 212. The differential 210 can be housed within a differential case. Unless otherwise described herein, the differential 210 can include similar components as described above with respect to the differential 10, FIG. 1.

Torque input to the differential 210 is typically by an input ring gear (not shown), which may be attached to a flange. A gear set is supported within the gear chamber 214 and has at least a pair of input pinion gears that are mounted rotatably about a pinion shaft, which is secured relative to the gear case 212 by any suitable mechanism. The pinion gears are input gears of the gear set and in meshing engagement with a respective pair of left and right side gears, 222 (one side gear shown in the FIG. 9). The side gears 222 define respective sets of internal, straight splines 226 (only one shown for gear 22) that are adapted to be in splined engagement with mating external splines on a respective pair of left and right axle shafts (not shown).

A rotation-prevention mechanism, generally indicated at 232, can be constructed similarly to the rotation-prevention mechanism 32, FIG. 1. A lock plate 234 is biased toward the non-actuated, "unlocked" mode by a return spring 235 such as a wave spring. An electronic actuator, generally indicated at 236, is disposed primarily external to the gear case 212. More specifically, the electronic actuator 236 is disposed at the end of and about the gear case 212 adjacent side gear 222 (the first output gear). The electronic actuator 236 has a stator 238 primarily external to the gear case 212. More specifically, the stator 238 can be disposed at the end of and about the gear case 212 adjacent to the flange 216. The stator 238 is stationary and non-rotating relative to the gear case. The electronic actuator 236 also has an electromagnetic (primary) coil, generally indicated at 240, that is disposed in a cavity 242 of the stator 238. The electromagnetic coil 240 is energized by a pair of electrical leads 244 and receives direct current (DC) from a source (not shown). The electronic actuator 236 also has an armature, generally indicated at 246, spaced from the electromagnetic coil 240 to form a gap 248 therebetween.

The armature 246 is mechanically coupled to the differential housing 212 with a retaining clip 250. The retaining clip 250 is formed of low magnetic permeable material such as 302 stainless steel. The stator 238 generates a strong enough flux field to pass through the differential case 212 and all nearby high magnetic permeable materials. A high permeable material (such as SAE 1090 steel) provided in prior art examples can interfere with the actuation of the armature 238 and cause poor performance of the differential 210. By using a low permeable material, the armature 246 will be able to actuate toward the magnetic field generated by the stator coil 240 without interference. While not specifically shown, the rotation prevention mechanism 232 can incorporate a position detection device such as the position detection device 60 described above.

With reference now to FIGS. 10-14, an electrically actuated locking differential 310 (FIG. 14) constructed in accordance to additional features will be described. Unless otherwise described herein, the electronically actuated locking differential 310 can be constructed similarly to the electronically actuated locking differential 10 described above. An electronic actuator 336 has a stator 338 primarily external to a gear case 312. More specifically, the stator 338 is disposed at the end of and about the gear case 312. The stator 338 is stationary and non-rotating relative to the gear case 312. The electronic actuator 336 also has an electromagnetic (primary) coil, generally indicated at 340, that is disposed in a cavity 342 of the stator 338. The electromagnetic coil 340 is energized by a pair of electrical leads 344 and receives direct current (DC) from a source (not shown). The electronic actuator 336 also has an armature, generally indicated at 346 (FIG. 14), spaced from the electromagnetic coil 340 to form a gap 348 therebetween.

Figure 10:
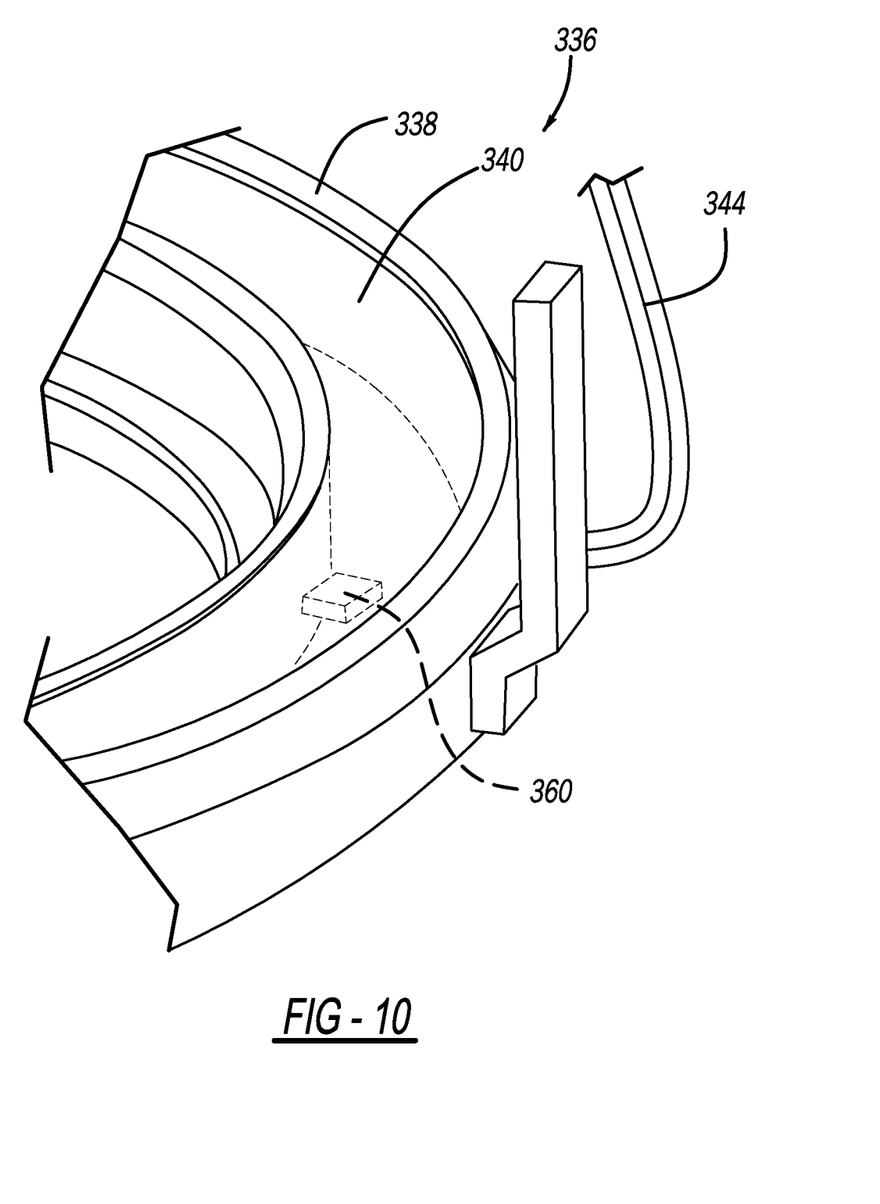
FIG. 10 is a partial perspective view of an electromagnetic stator having a sensor thereon configured to detect a position of an armature plate according to additional features of the present disclosure.
Figure 11:
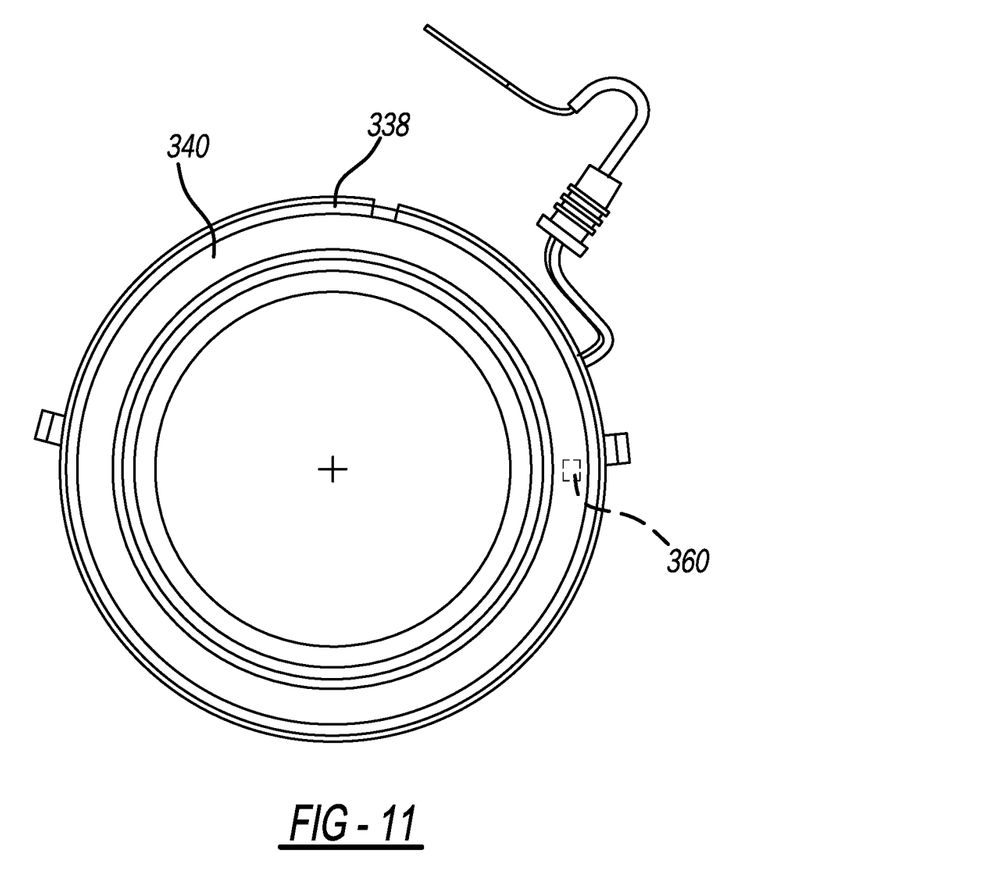
FIG. 11 is a plan view of the electromagnetic stator of FIG. 10.
Figure 12:
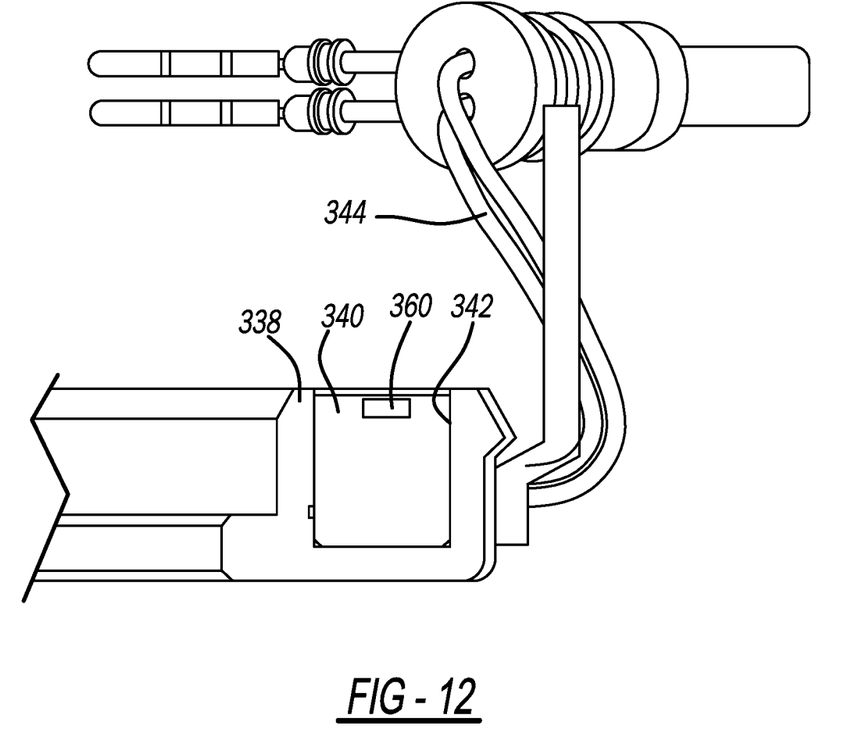
FIG. 12 is a cross sectional view of the electromagnetic stator of FIG. 10.
Figure 13:
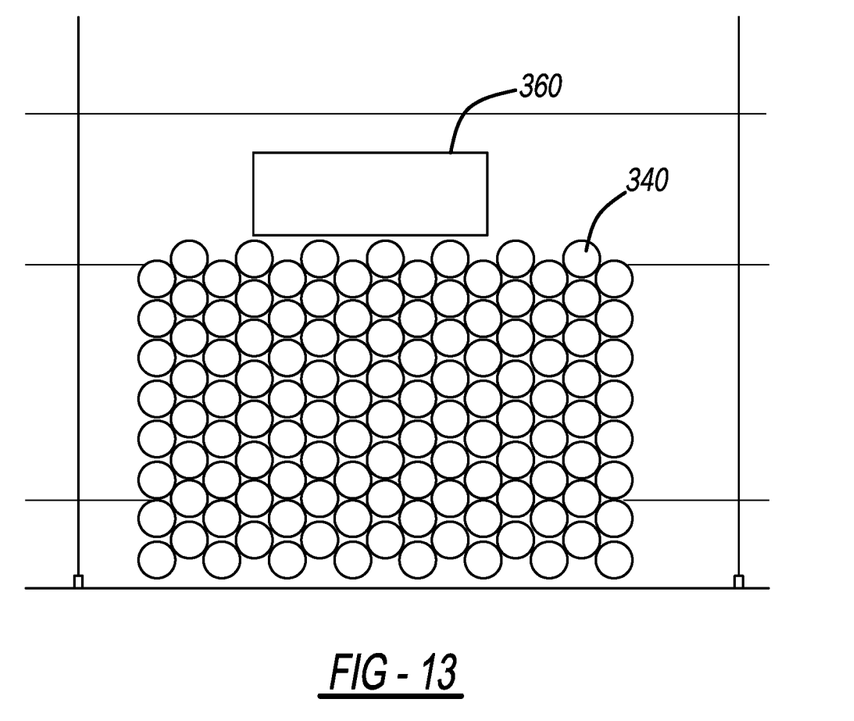
FIG. 13 is a schematic illustration of a primary coil and position sensor arrangement of a locking differential of the present disclosure.
Figure 14:
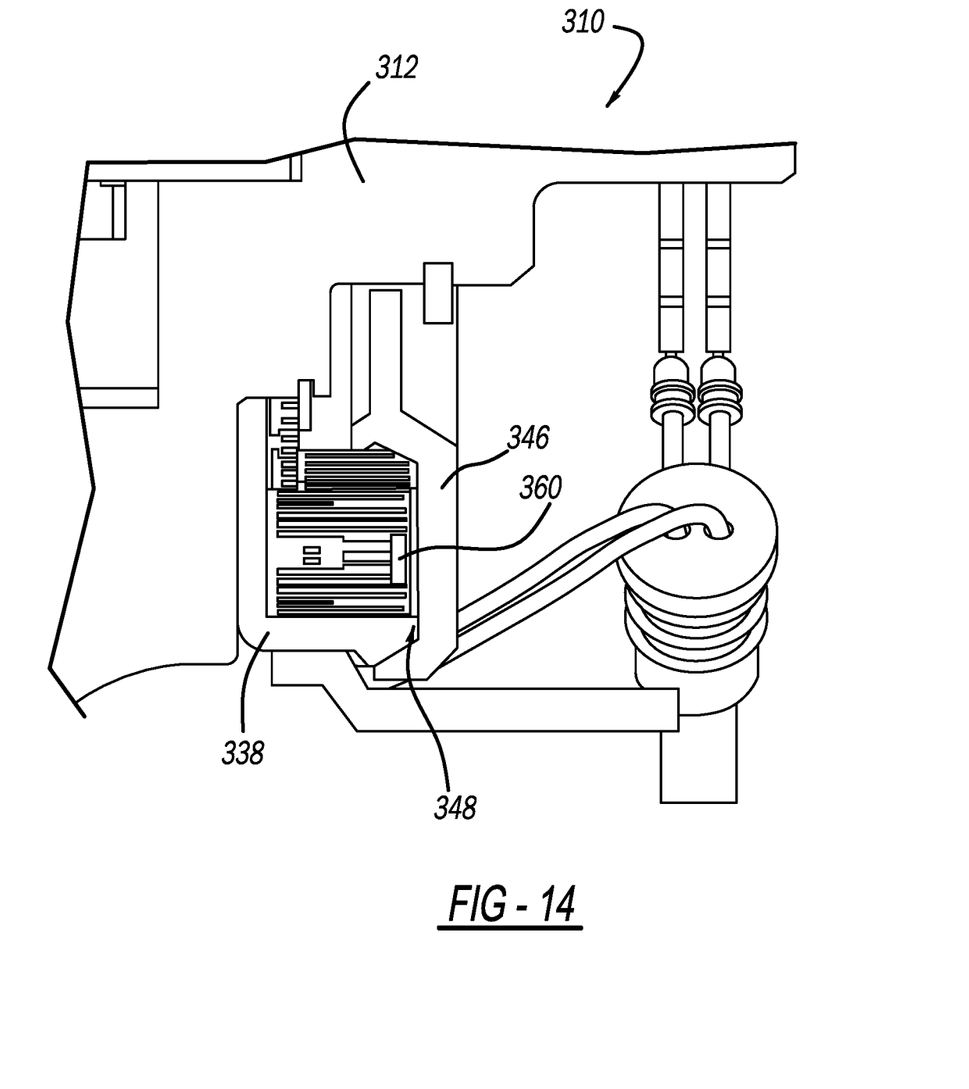
FIG. 14 is a cross-sectional view of a locking differential that incorporates the electromagnetic stator and sensor configuration of FIG. 10.

The actuator 336 includes a position detection device or sensor 360 disposed in the stator 338 as will be described herein. The sensor 360 can be placed on or near the primary coil 340 within the boundary of the housing of the stator 338. The sensor 360 can be housed within the boundary of the stator 338 providing a pre-packaged self-contained assembly that can be more easily handled in the field as opposed to sensors that are arranged outside of the stator 338. Furthermore, as the sensor 360 is more protected within the structure of the stator 338 once mounted within an axle assembly improving robustness and longevity. Packaging concerns therefore are minimized greatly over prior art examples that may have a sensor outside of the stator 338. The sensor 360 is used to determine the position of the armature 346 relative to the stator 338 to interpret the state of the differential 310 in the locked, semi-engaged or unlocked condition. A signal can be sent from the sensor 360 indicative of a change in inductance to a controller (such as a controller 80, FIG. 4) that sends a signal to a display or other vehicle instrumentation (such as cluster 82, FIG. 4) to convey the state of the differential to the driver. In some examples, the sensor 360 can be a low cost latching sensor or other suitable sensor.

The present teachings provide a solution in that a driver can be notified when the differential is locked or unlocked and when the primary coil is on (energized) or off (de-energized). As can be appreciated, there may be a delay between when a driver initiates the locking of the differential (such as by activating the switch or button 84), and when the armature has been sufficiently moved to a position that results in the differential being locked. Further, the driver is provided real time status on the console 86 of the energized state of the primary coil and the locked status of the armature.

The teachings have been described in great detail in the foregoing specification, and it is believed that various alterations and modifications of the many aspects of the present teachings will become apparent to those having ordinary skill in the art from a reading and understanding of the specification. It is intended that all such alterations and modifications are included in the teachings, insofar as they come within the scope of the appended claims.

What is claimed is:

1. A position detection device configured for use with a locking differential, the position detection device configured to determine a position of an armature in relation to a stator, the stator having a primary coil that comprises an outer diameter and defines a primary coil axis, the armature moving relative to the stator between engaged and disengaged positions corresponding to the locking differential being in a locked and unlocked state, the position detection device comprising:
   only a single secondary coil disposed proximate to the primary coil and radially disposed within the outer diameter of the primary coil, wherein the secondary coil defines a secondary coil axis; and
   wherein the secondary coil is positioned such that the primary and secondary coil axes are offset and parallel, the secondary coil configured to determine a change in inductance based on movement of the armature, the change in inductance indicative of a change in position of the armature relative to the stator, wherein the primary coil is disposed within a first boundary of the stator and wherein the secondary coil is disposed within a second boundary of the primary coil.

2. The position detection device of claim 1 wherein the stator defines a housing, the primary and secondary coils being disposed within the housing.

3. The position detection device of claim 1 wherein the secondary coil can determine (i) when the primary coil is on and (ii) when the primary coil is off.

4. The position detection device of claim 3, further comprising a primary coil status indicator that indicates an energized state of the primary coil.

5. The position detection device of claim 3 wherein the secondary coil can determine (iii) when the armature is in the disengaged position and (iv) when the armature is in the engaged position.

6. The position detection device of claim 5, further comprising a locked status indicator that indicates whether the armature is locked or unlocked.

7. The position detection device of claim 1 wherein the armature is mechanically coupled to a housing of the locking differential with a retaining clip.

8. The position detection device of claim 7 wherein the retaining clip is formed of low magnetic permeable material.

9. The position detection device of claim 8 wherein the low magnetic permeable material comprises 302 stainless steel.

10. The position detection device of claim 1 wherein the primary coil defines the primary coil outer diameter and the secondary coil defines a secondary coil outer diameter, the secondary coil outer diameter being at least less than half of the primary coil outer diameter.

11. The position detection device of claim 10 wherein the secondary coil outer diameter is less than one-third of the primary coil outer diameter.

12. The position detection device of claim 11 wherein the secondary coil outer diameter is less than one-fifth of the primary coil outer diameter.

* * * * *